(12) United States Patent
Loafman et al.

(10) Patent No.: US 8,671,414 B1
(45) Date of Patent: Mar. 11, 2014

(54) ACCELERATING DATA INTENSIVE COMPUTING APPLICATIONS BY REDUCING OVERHEAD ASSOCIATED WITH COMMUNICATION PROTOCOLS

(75) Inventors: Zachary Merlynn Loafman, Seattle, WA (US); Frank Charles Paterra, Kirkland, WA (US); Deepak Sunny Veliath, San Jose, CA (US); John Thomas Cardente, Milford, MA (US); John Forecast, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 153 days.

(21) Appl. No.: 13/287,866

(22) Filed: Nov. 2, 2011

Related U.S. Application Data

(60) Provisional application No. 61/484,183, filed on May 9, 2011.

(51) Int. Cl.
*G06F 9/44* (2006.01)
*G06F 9/455* (2006.01)

(52) U.S. Cl.
USPC ............................................ 719/312; 718/106

(58) Field of Classification Search
None
See application file for complete search history.

(56) References Cited

U.S. PATENT DOCUMENTS

| 7,424,710 B1 * | 9/2008 | Nelson et al. ............... 718/1 |
| 2002/0103663 A1 | 8/2002 | Bankier et al. |
| 2005/0039180 A1 * | 2/2005 | Fultheim et al. ............... 718/1 |
| 2006/0047813 A1 | 3/2006 | Aggarwal et al. |
| 2006/0294238 A1 | 12/2006 | Naik et al. |
| 2008/0313331 A1 | 12/2008 | Boykin et al. |
| 2009/0271510 A1 | 10/2009 | Goel et al. |
| 2010/0058352 A1 | 3/2010 | Esfahany et al. |
| 2011/0022812 A1 * | 1/2011 | van der Linden et al. .... 711/163 |

OTHER PUBLICATIONS

Official Communication for U S. Appl. No. 13/287,901 mailed on Mar. 29, 2013.

* cited by examiner

*Primary Examiner* — Andy Ho
*Assistant Examiner* — Abdou Seye
(74) *Attorney, Agent, or Firm* — Frommer Lawrence & Haug LLP; John W. Branch

(57) ABSTRACT

Various embodiments are directed toward improving Virtual Machine performance by reducing the amount of communication protocol processing performed between co-resident Virtual Machine guest applications executing on the same physical machine. Overhead can be reduced by short-circuiting the full communication protocol stack when a plurality of Virtual Machine guest applications are hosted and executing on the same physical machine such as a data storage node or a compute accelerator node. Improvements may also be realized by enabling the sharing in virtual memory of physical memory pages between co-resident Virtual Machine guest applications, and employing a low latency high bandwidth network for enabling guest applications to communicate with each other that are located in different nodes in a data storage cluster.

12 Claims, 8 Drawing Sheets

ACCELERATING DATA INTENSIVE COMPUTING APPLICATIONS BY REDUCING OVERHEAD ASSOCIATED WITH COMMUNICATION PROTOCOLS

CROSS-REFERENCE TO RELATED APPLICATIONS

This application claims the benefit of U.S. Provisional Application Ser. No. 61/484,183 filed on May 9, 2011, entitled "Accelerating Data Intensive Computing Applications by Reducing Overhead Associated with Communication Protocols," the benefit of the earlier filing date of which is hereby claimed under 35 U.S.C. Section 119 (c) and 37 C.F.R Section 1.78, and is further incorporated herein by reference.

TECHNICAL FIELD

Various embodiments relate generally to managing computing resources for applications in a file system, and more particularly to, accelerating the computing of data intensive applications by reducing overhead among a plurality of processes.

BACKGROUND OF THE INVENTION

Modern high performance computing often requires computing tasks to be distributed and executed on separate computers. Often operators build and deploy computer hardware and software platforms optimized for particular types of computing tasks. For example, some computing tasks may be processor intensive, high-speed memory intensive, data intensive, communication intensive, or combination of the above. Computing tasks are often deployed on computing hardware that is arranged to complement the particular computing tasks they are intended to host. Such arrangements may include additional processors for processor intensive computing tasks, fast local memory and high speed local busses to support local memory intensive tasks, high-performance network interfaces for communication intensive computing tasks, and the like.

In addition, some computing tasks may have operational requirements that may vary during the course of execution. For example, a computing task may begin by retrieving a large amount of data requiring high performance data access, and then once the data has been pulled into local memory the computing task may become processor intensive as it begins to process the retrieved data collections, and so on. In such cases, it may be difficult to arrange a single computing device to optimally execute all phases of the computing task.

In some high performance applications, it may be desirable to execute computing tasks in virtual machines running on the same physical computer. Often the computing tasks in different virtual machines executing on the same physical computer are required to communicate and interact with each other. Even though the computing tasks are hosted on the same physical computer, performance may be hindered by communication and network overhead costs.

If communication and network overhead costs can be reduced, a computing platform can be provided that is significantly faster and more efficient.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF THE VARIOUS EMBODIMENTS

Figure 1:
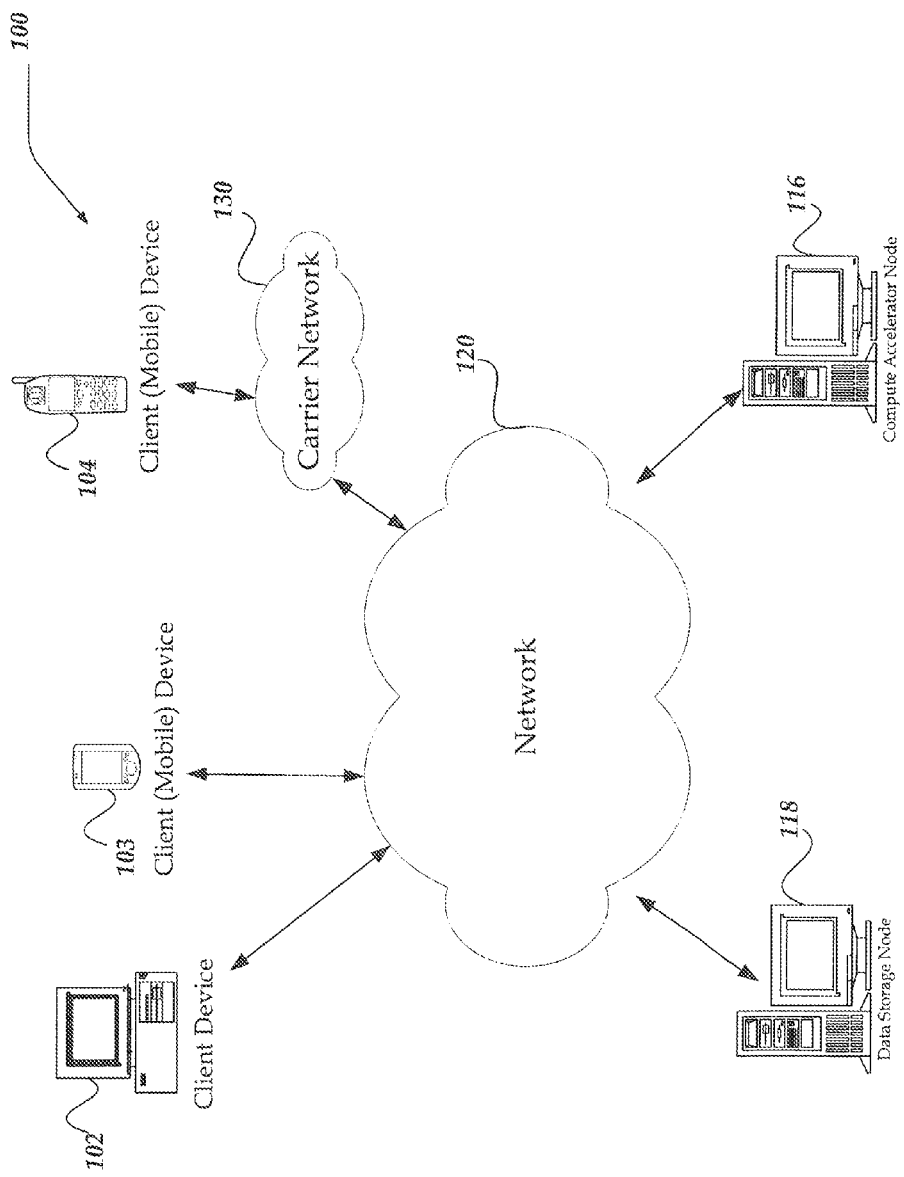
FIG. 1 illustrates an overview of a system in which various embodiments may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the various embodiments.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

Briefly stated, various embodiments are directed toward improving Virtual Machine performance by reducing the amount of communication protocol processing performed between co-resident Virtual Machine guest applications executing on the same physical machine. Overhead can be reduced by short-circuiting the full communication protocol stack when a plurality of Virtual Machine guest applications are hosted and executing on the same physical machine such as a data storage node or a compute accelerator node. Improvements may also be realized by enabling the sharing in virtual memory of physical memory pages between co-resident Virtual Machine guest applications.

In various embodiments, distributed data storage clusters may be built with one or more data storage nodes and one or more compute accelerator nodes. A data storage cluster can be interconnected by a high-bandwidth, low latency network backplane. Typically, compute processes accessing the distributed data storage cluster communicate through a high-latency, relatively low-bandwidth front side network connection, such as Ethernet, and the like.

Figure 2:
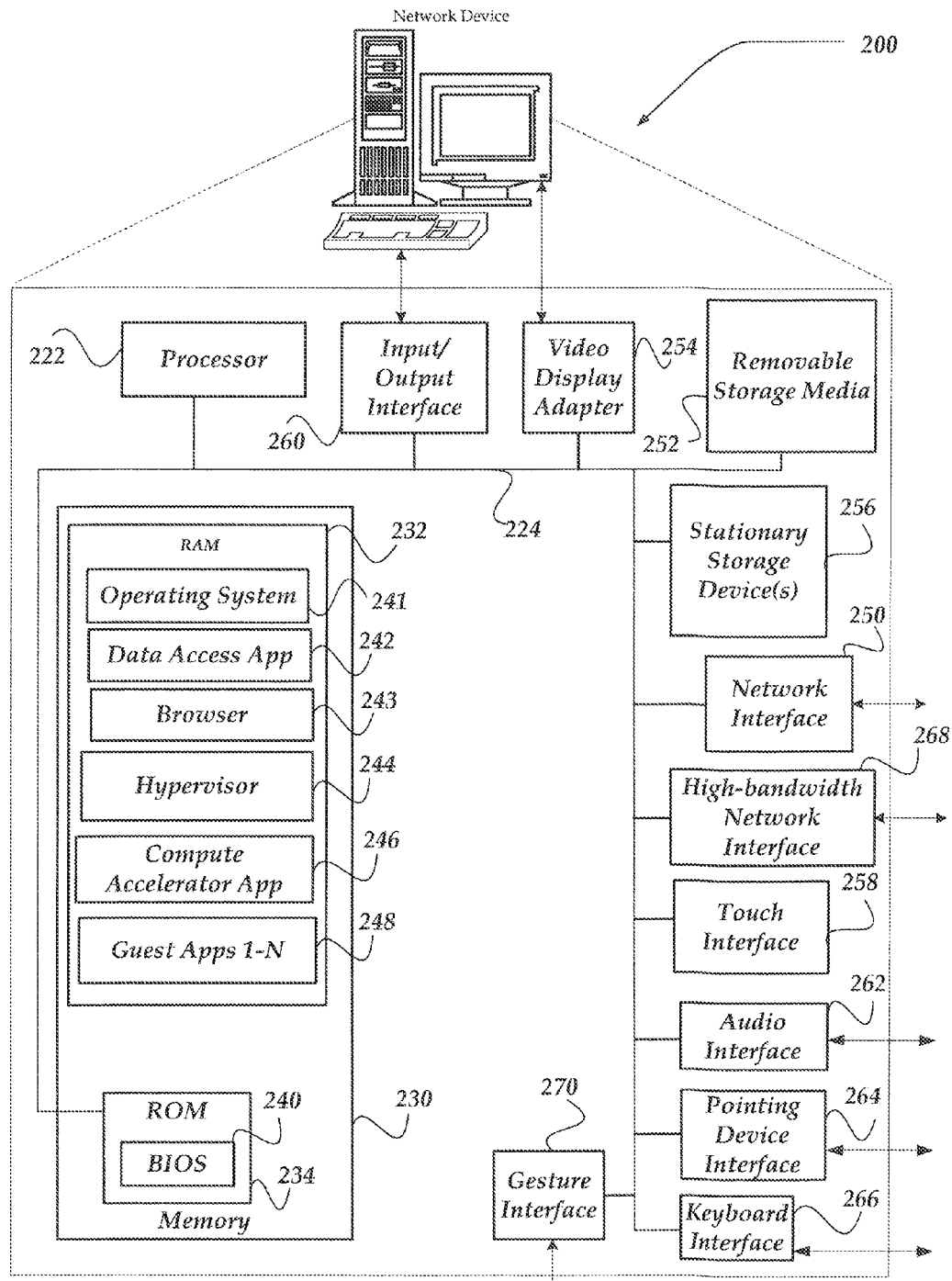
FIG. 2 shows an exemplary network device that may be arranged as compute accelerator node or a data storage node.
Figure 3:
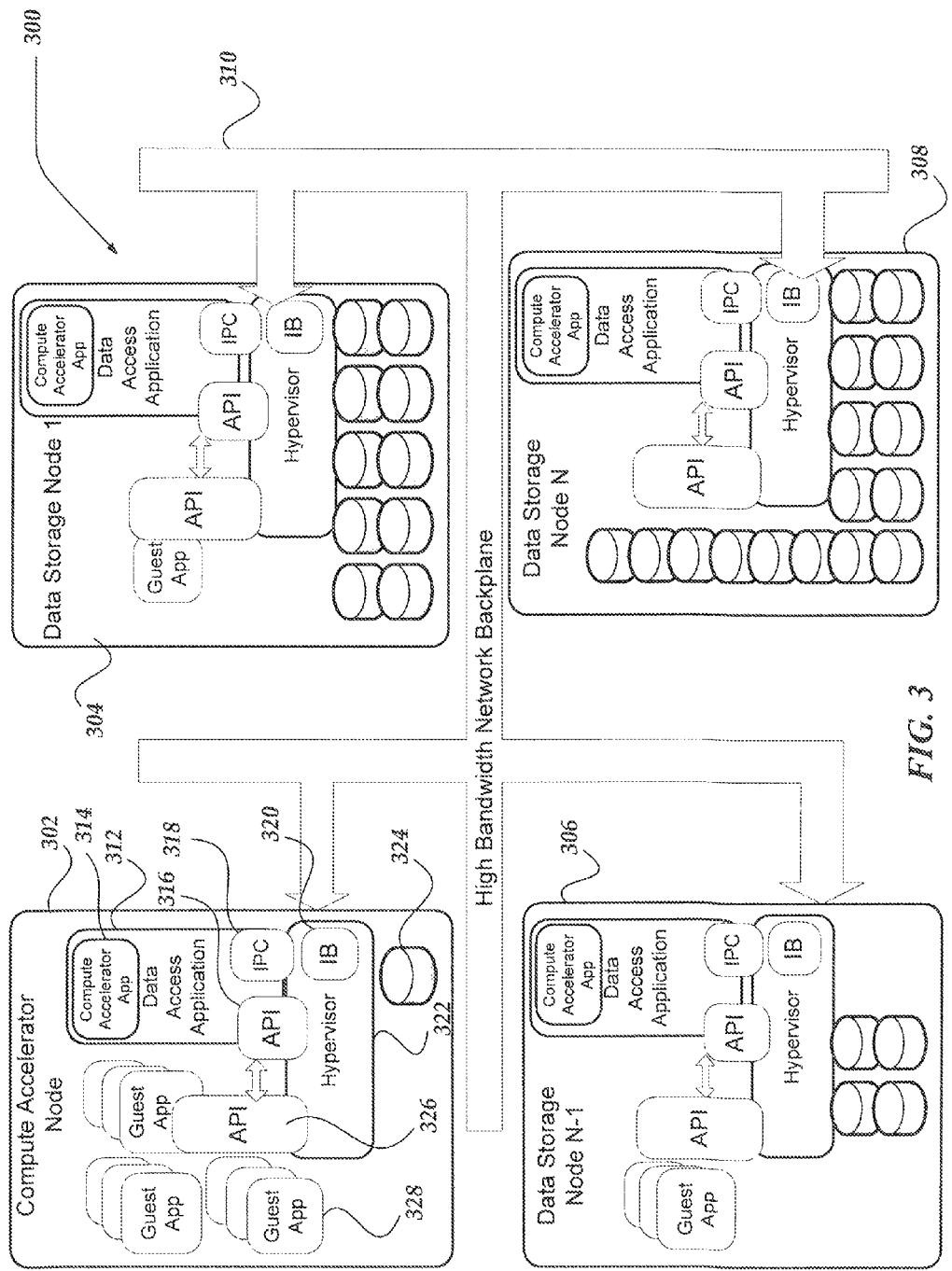
FIG. 3 illustrates an example of a system in which various embodiments of a compute accelerator node and data storage nodes that are coupled to each other over a high bandwidth network backplane.

In various embodiments, performance can be improved by moving guest applications onto the same physical machine as a distributed data access controller. Since the physical machine that the data access controller is on is connected to the data storage cluster's high-bandwidth network backplane, performance can be increased by reducing communication between guest applications executing on different nodes within the data storage cluster over a slow, relatively high latency network, such as Ethernet. Also, in various embodiments, different types of guest applications, such as data storage access applications and computing applications can be hosted in virtual machines ("VMs") running on the same physical machine (node) under the control of a hypervisor, such as, VMware, VirtualBox, Xen, and the like. Exemplary embodiments of physical machines (nodes) are shown in FIGS. 2 and 3.

A VM emulates the entire computer's resources, including it's operating system that the guest application requires to execute. Typically, a VM for a guest application is instantiated with a complete communication networking stack, such as the Open System Interconnection (OSI) Reference Model, that connects to an abstract network interface provided by the hypervisor. Generally, guest applications executing in VMs are unaware that they are virtualized. Thus, if using communication protocols, the guest applications running in their corresponding VMs execute network protocol system calls as if they were actually going to communicate with each other over an external network, such as Ethernet. Likewise, on the receiving end of a request, the guest application executes through all of the layers of the network stack to decode and process incoming requests. In the past, if both the sending and receiving guest applications were running in VMs that were co-resident on the same physical machine (node), then computational resources employed to separately run through the entire communication networking stack for each guest application was wasted. Examples, of unnecessary computation include, high and low level protocol handshaking, packetizing the transaction at each level of the OSI stack, and the like. From the perspective of the physical machine hosting the VMs for the guest applications, each of the co-resident VMs are separate user space processes. Thus, communication among guest applications running within co-resident VM's can be improved by using faster inter-process communication protocols such as those on a high bandwidth low latency network, instead of relatively slower communication protocols for a relatively higher latency and lower bandwidth network such as Ethernet and the like.

In one embodiment, performance is improved by enabling the guest applications to run in co-resident VM's to transparently use low latency high speed inter-process communication mechanisms to communicate with other guest applications running in co-resident VM's. Guest applications running within the co-resident VM's may not change system calls, or modify their code base any differently from what they would use for executing standard network communication protocols. For example, a guest application running in a co-resident VM can be unaware that another guest application it is targeting is running in a co-resident VM.

Exemplary Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client device(s) 102, mobile (client) devices 103-104, network 120, carrier network 130, one or more Data Storage nodes 118, and one or more Compute Accelerator Nodes 116. Network 120 is in communication with and enables communication between each of the elements of system 100. Carrier network 130 further enables telephonic communication with wireless communication devices such as mobile device 104.

Client devices 102-104 may include virtually any computing device capable of receiving and sending a message over a network, and/or to and from another computing device. The set of such devices may include devices that typically connect using a wired communications medium such as personal computers, tablet computers, multiprocessor systems, microprocessor-based or programmable consumer electronics, network PCs, and the like. Further, client devices 102-104 may include any device that is capable of connecting via a wireless communication signal such as a personal digital assistant (PDA), pocket PC, wearable computer, portable computing device, tablet computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Client devices may also include integrated devices combining one or more of the preceding devices and/or elements of one or more of these devices.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like. Client devices 102-104 may further include a voice over IP (VoIP) application that enables voice communication over network 120 separate from carrier network 130.

Network 120 is configured to couple one computing device to another computing device, enabling them to communicate.

Network 120 is enabled to employ any form of medium for communicating information from one electronic device to another. Also, network 120 may include a wireless interface, and/or a wired interface, such as the Internet, Cloud Computing, and the like, in addition to local area networks (LANs), wide area networks (WANs), direct connections, such as through a universal serial bus (USB) port, other forms of communication medium, or any combination thereof. On an interconnected set of LANs, including those based on differing architectures and protocols, a router, switch and/or other network appliance may act as a link between LANs, enabling messages and data to be sent from one to another. Also, communication links within LANs may include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Carrier network 130 may include wireless interfaces, wireless forms of communication, and/or wireless links such as cellular networks, satellite links, Infra-Red, Micro-Wave links, Open Air Laser links, and the like. These wireless links may include various mobile communication protocols such as wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like.

The medium used to transmit information in mobile communication links as described above may generally include any communication medium or media that can be accessed by a computing device. Such media may include any processor readable non-transitory storage media. Processor readable media may also include transitory wired and/or wireless communication media, or any combination thereof. Additionally, processor-readable media typically embodies computer-readable instructions, data structures, program modules, or other data. Such data may be stored on the processor readable non-transitory storage media. Such data may also be communicated through a communication medium in a modulated data signal such as a carrier wave, data signal, or other transport mechanism and can include any type of data. The signal can have one or more of its characteristics set or changed in such a manner as to encode information, instructions, data, and the like. By way of example, communication media includes wireless media such as fluids or space for acoustic, RF, infrared, and other wireless signals, and wired media such as twisted pair, coaxial cable, fiber optics, wave guides, and other wired media.

Data Storage Node(s) 118 and Compute Accelerator Node(s) 116 may comprise multiple computing devices, components of a single computing device, or a single device with multiple software features. In some embodiments, Data Storage Node(s) 118 and/or Compute Accelerator Node(s) 1116 may comprise a cluster of network devices, such that functionality is shared among the network devices of the cluster in a load-balanced and/or parallel processing. In some embodiments, system 100 may include load balancers (not shown) or other network devices that manage the load balancing of tasks among Data Storage Node(s) 118 and/or Compute Accelerator Node(s) 116 respectively.

In some embodiments, Data Storage Node(s) 118 and Compute Accelerator Node(s) 116 may use external data storage for storing data. The stored data may include web sites, databases, log files, online journals (e.g., blogs), photos, reviews, and information regarding online services such as messaging, search, news, shopping, advertising, travel services, or virtually any other type of data. Additionally, in some embodiments, a user of client devices 102-104 may access data and guest application(s) installed on Data Storage Nodes 118 and Compute Accelerator Node 116.

FIG. 2 shows one embodiment of a network device, according to at least one of the embodiments. Network device 200 may include many more, or fewer, components than those shown. The components shown, however, are sufficient to disclose an illustrative embodiment. Network device 200 may represent, for example, Data Storage Node 118, and Compute Accelerator Node 116 of FIG. 1.

As shown in FIG. 2, network device 200 includes processor 222 in communication with mass memory 230 via bus 224. Mass memory 230 may include RAM 232, ROM 234, and other memory storage means. Mass memory 230 illustrates an example of computer readable storage media for storage of data such as computer readable instructions, data structures, program modules or other data. Mass memory stores a basic input/output system ("BIOS") 240 for controlling low-level operation of network device 200. The mass memory also stores an operating system 241 for controlling the operation of network device 200. It should be appreciated that this component may include a general purpose operating system such as a version of Windows®, UNIX, or LINUX®, or a specialized mobile communication operating system such as Apple iOS®, Google Android®, Windows Mobile™, the Symbian® operating system, or the like. The operating system may include, or interface with a Java® virtual machine module that enables control of hardware components and/or operating system operations via Java application programs.

Memory 230 can be utilized by network device 200 to store programs, applications, software modules, and the like, as well as the data used by such programs, applications, and/or software modules. Applications may comprise processor executable instructions which can be executed by network device 200. Programs in mass memory 230 may include a browser application 243. Browser 243 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 230 may also include several guest applications (1-N) 248, and Hypervisor 244 application. Memory 230 may further include Data Access application 242 and Compute Accelerator application 246 which enable access to data stored on storage devices.

Mass memory 230 may also include other applications that are not shown. Other examples of applications include content management applications, messaging applications, schedulers, calendars, web services, transcoders, database programs, word processing programs, spreadsheet programs, and so forth. Accordingly, some of these applications may process images, audio, video, or markup pages, enable telecommunication with another user of another electronic device, and/or other services.

Network device 200 also includes an input/output interface 260 for communicating with input/output devices such as a Joystick, wheel, rocker switches, keypad, printer, scanner, modem, video camera, modem, and/or other input devices not specifically shown in FIG. 2. A user of network device 200 can use input/output devices to interact with a user interface that may be separate or integrated with operating system 241, and/or programs in memory 230. Interaction with the user interface includes visual interaction via a display coupled to video display adapter 254. The user interface can also include gesture interface 270, touch interface 258, pointing device interface 264, keyboard interface 266, and audio interface 262.

Network device 200 may include removable storage media 252 and stationary storage device(s) 256. Removable storage media 252 can comprise one or more of an optical disc drive, flash memory drive, hard drive, a floppy disk drive, tape drive, and/or any other type of processor readable non-transitory storage media. Stationary storage device 256 or removable storage media 252 may include any method or technology for processor readable non-volatile storage of data, such as processor readable instructions, data structures, program modules, text, or other data. Examples of processor readable non-volatile storage media include a CD-ROM, digital versatile disks (DVD) or other optical storage, magnetic cassettes, magnetic tape, magnetic disk storage or other magnetic storage devices, RAM, ROM, EEPROM, flash memory, flash drives or other memory technology, hard disk drives, or any other media which can be used to store data that can be accessed by a computing device.

Via a network communication interface unit 250, network device 200 can communicate with a communication protocol, such as Ethernet and the like, with a wide area network such as the Internet, Cloud Network, a local area network, a wired telephone network, a cellular telephone network, or some other communications network, such as networks 120 and/or carrier network 130 in FIG. 1. Additionally, high bandwidth network interface 268 is provided to enable network device 200 to communicate with other co-located network devices at vastly greater speeds than network interface 250. For example, network device 200 may be physically embodied on a "blade" or card in a chassis that supports the operation of several co-located blades and provides access to a high bandwidth network backplane for the network devices to communicate particular information between each other over high bandwidth network interface 268.

FIG. 3 illustrates an exemplary schematic overview of data cluster 300 which includes four nodes: compute accelerator node 302, and three data storage nodes 304, 306, and 308. Each node is coupled to high bandwidth network backplane 310 which enables low latency, high bandwidth network communication between each node in the cluster. Communication over backplane 310 is separate from communication over a higher latency and relatively lower bandwidth network medium (not shown) such as Ethernet, and the like.

Compute Accelerator node 302 includes data access application 312 and compute accelerator application 314 which are in communication with hypervisor 322 both through application programming interface (API) 316 and through (IPC) 318. Hypervisor is also in communication over backplane 310 with separate hypervisors that are resident on each of the other nodes (304, 306 and 308) through interface bus (IB) 320. A plurality of guest applications 328 are co-resident on node 302 and each are in communication with hypervisor 322 through application programming interface (API) 326. Also, node 302 includes a stationary storage device 324 that is generally employed to service the data storage needs for the guest applications 328, data access applications 312, compute accelerator application 314 and hypervisor 322.

Data storage nodes 304, 306, and 308 are arranged with substantially the same components a compute accelerator node 302 but with some differences. For example, data storage node 308 does not have resident guest applications but it does include a relatively large amount of stationary storage devices that may be employed to provide data storage for guest applications resident on other nodes that may be within or outside cluster 300, along with a resident data access application, a resident compute accelerator application, and a resident hypervisor.

Somewhat similarly to node 308, data storage node 304 includes a relatively large amount of stationary storage devices (although less than node 308) that are employed to provide data storage for a single guest application resident on node 304, other guest applications resident on other nodes within or outside cluster 300, along with a resident data access application, a resident compute accelerator application, and a resident hypervisor.

Also, node 306 is somewhat similar in that it provides relatively less resident stationary storage devices than node 304 but more than node 302 and relatively more resident guest applications than node 304 but less than node 302.

Additionally, over time and depending upon various factors such as latency, load, processing capacity, and the like, all of the nodes may increase or decrease the number of guest applications that are resident on a particular node. Furthermore, backplane 310 may be employed for communication between guest applications that are resident on nodes within cluster 300 instead of a relatively higher latency and lower bandwidth network, such as Ethernet.

Exemplary Flowcharts

FIG. 4 shows process 400 for a Fast Guest Data Path (FGDP) that enables applications running in co-resident Virtual Machines (VMs) to communicate utilizing non-networked communication techniques. Increased performance can be obtained by "short circuiting" the low-latency network communication protocols if initiating communication between guest applications running on co-resident VMs. Because co-resident VMs are processes running within the same operating system environment (in the hypervisor) on the same physical machine, low latency, high speed inter-process communication mechanisms can be employed for improved performance. This can be accomplished by intercepting the communication transaction at the Application Layer of the communication stack which is based on the Open Systems Interconnection (OSI) reference model. If running processes execute Application Layer system calls to initiate network communication, the communication transaction may be intercepted and examined before the computationally expensive protocol overhead occurs. If the communication is targeting a co-resident VM, the transaction can be intercepted and transmitted to the intended application process through the Fast Guest Data Path (FGDP).

The FGDP proxies and marshals the network protocol transaction through low overhead inter-process communication methods, such as Unix Domain Sockets, Shared Memory, Pipes, and the like. FGDP may by enabled by software modules that interface with the host hypervisor by using hypervisor provided API's to facilitate inter-process communication among applications running on co-resident VM's. Or, if the hypervisor does not provide direct support for communication among applications running on co-resident VM's, specialized extensions may be installed on the co-resident VM's in order to enable them to take advantage of the FGDP. Additional techniques of implementing inter-process communication among applications running on co-resident VM's include, providing daughter processes running on the physical machine outside of control of the hypervisor. In this case, the FGDP VM extensions would enable communication with the daughter process to implement the FGDP on the physical machine. It should be appreciated that one of ordinary skill in the art would be able to implement inter-process communication among co-resident VM's in any number of ways.

Figure 4A:
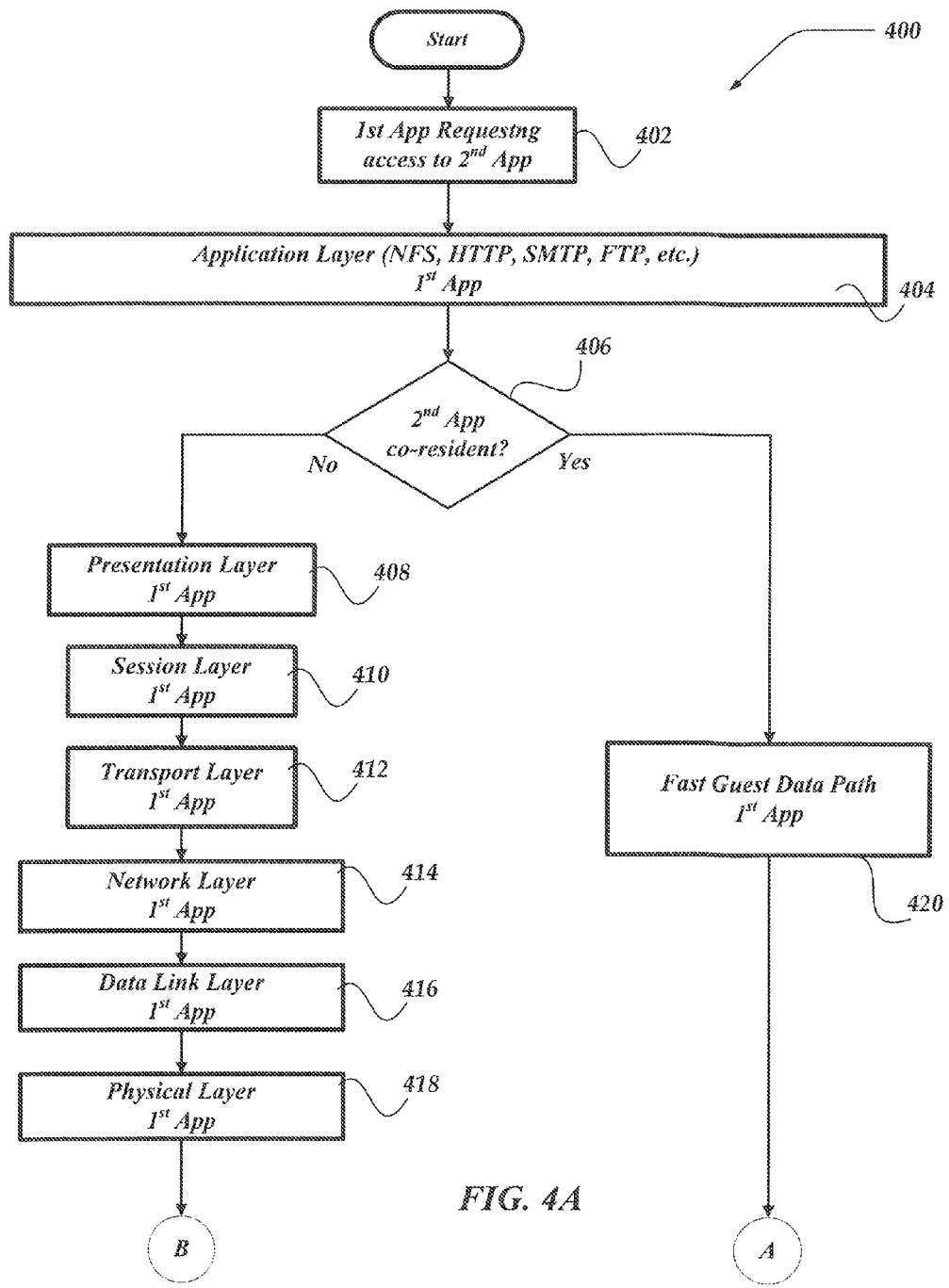
FIGS. 4A and 4B show a flowchart of a process for providing a fast data path for the virtual machine communication layers between guest applications that are co-resident on the same node.
Figure 4B:
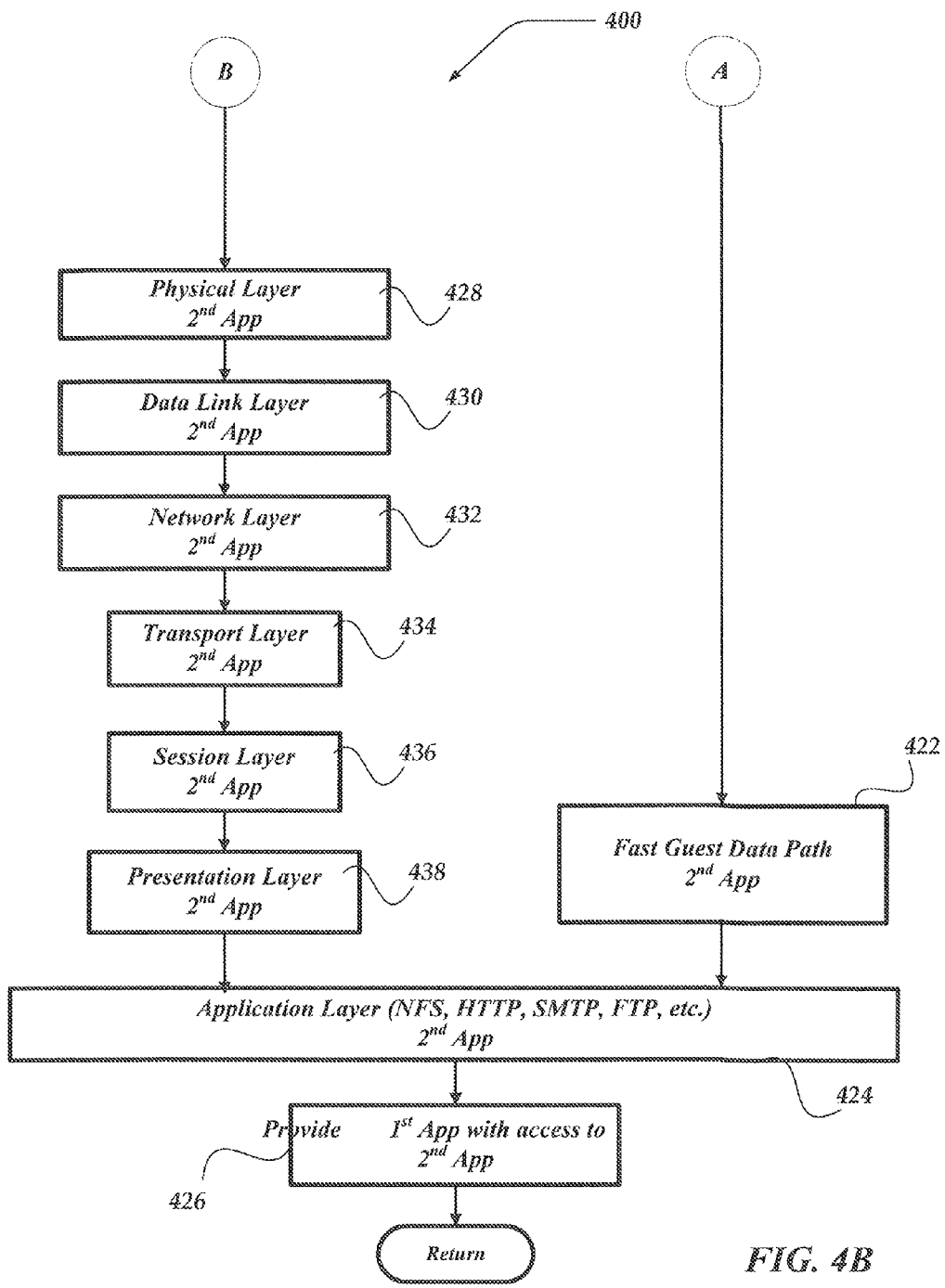

In FIGS. 4A and 4B, moving from the start block, process 400 advances to block 402 where a first guest application running in a Virtual Machine on a node requests access to a second guest application running in its own Virtual Machine. The first guest application that is running as process within it's VM initiates a request to access a second application through standard network communication protocol. In at least a portion of the various embodiments, the request begins at the Application Layer of the OSI communication Stack. For example, opening a file for read that is stored on a Network File System (NFS) drive. The first guest application executes the appropriate system call to open the file for reading. Next, the local operating system parses the path of the file and determines that the file is stored on a NFS drive triggering the NFS system libraries to initiate network communication.

At block 404, the request is passed to the application (top) layer of a seven layer communication protocol stack such as the Open Sources Interconnection (OSI) reference model. Moving to decision block 406, the process determines if the second guest application is co-resident on the same node as the first guest application. Examples of co-resident guest applications are shown in FIG. 3 for nodes 302 and 306. Also, node 304 illustrates an example of a single guest application, i.e., another guest application is not co-resident.

At decision block 406 a determination is made whether the NFS drive is served by a guest application running on a co-resident VM, or whether the NFS drive is served by another application process running on another physical machine, and the like. Different embodiments may employ different methods to determine whether the second application is a co-resident VM. For example, the parent hypervisor may provide an API interface that enables guest VM's to query the hypervisor for a list of co-resident VM's, or alternatively, each VM may maintain a record of which hosts are co-resident VM's, possibly contained in a configuration file, and the like. In at least some of the various embodiments, the determination at block 406 may be performed in part by at least one of the data access application and the compute accelerator application as shown in FIGS. 2 and 3. Also, access to the stationary data storage devices on the node continues to be managed by the data access application.

If at block 406 it is determined whether the first application is targeting access to a second application running on a different physical machine/node, or the target is not recognized as running on a co-resident VM, then the process moves to block 408 and employs the presentation layer offered by the network communication protocol running on the VM for the first guest application. Next, the process moves down through the other blocks for the communication protocol layers for the VM for the first guest application, e.g., 410 (Session layer), 412 (Transport layer), 414 (Network Layer), 416 (Data Link Layer), and 418 (Physical Layer).

At block 428, the request for access is received from block 418 at the lowest level of the communication stack, such as, the Physical Layer, that corresponds to the VM for the second guest application. Then the communication transaction continues, with the first guest application's request for access working its way up through multiple layers of communications protocol layers running in the corresponding VM for the second guest application, e.g., 430 (Data Link Layer), 432 (Network Layer), 434 (Transport Layer), 436 (Session Layer), 438 (Presentation Layer), and 424 (Application Layer).

At block 426, the first guest application's request is received from block 426 and provided to the second guest application for further processing. Next, the process returns to performing other actions, such as a response from the second guest application to the request received from the first guest application.

Additionally, if the process determined that the second guest application running on another node is within the same data cluster as the node for the first guest application, then the request is communicated to the other node over a high bandwidth low latency network communication backplane instead of a relatively lower bandwidth communication network such as Ethernet. Alternatively, if the process determines that the second guest application running on another node is not within the same data cluster as the node for the first guest application, then the request is provided to the other node over a relatively low bandwidth communication network such as Ethernet.

Alternatively, if at decision block 406 it is determined that the first application is requesting access to a second application that is both running in a separate Virtual Machine and co-resident on the same node (physical machine), the process is diverted away from the standard communication protocol layers of blocks 408, 410, 412, 414, 416, and 418. Instead, the process flows to block 420 where Fast Guest Data Path (FGDP) processing is employed to forward the request directly to the application layer of the Virtual Machine for the co-resident second application. The FGDP process employs low-overhead inter-process communication methods to bypass the communication layers below the Application Layers for the Virtual Machines of both the first guest application and second guest application.

Also, in various embodiments, the FGDP process may intercept the communication between co-resident guest applications below the Application Layer. For, example, at least one embodiment may test if FGDP processing is available for communication between co-resident guest applications at a lower level of the OSI stack, such as, within the Transport Layer. Further, at least one embodiment may test whether the FGDP processing is available at multiple levels of the OSI stack, and bypass the layers below the highest determined layer with access to the FGDP process.

At block 422, FGDP processing for the second guest application receives from FGDP processing at block 420 the request from the first guest application. At block 424, the first guest application's request is provided at the application layer of the OSI stack of the VM for second guest application. Next, at block 426, the process provides the first guest application's request to the second guest application for further processing. Next, the process returns to performing other actions.

Generally, each guest application running with its own VM is listening at the application layer for requests from other guest applications. For example, a guest application may be a web server listening for HTTP requests at the application layer. Since guest applications are generally listening for requests at the application layer, the FGDP processing is transparent to the operation of the co-resident guest applications. Additionally, in at least some of the various embodiments, if the second guest application responds to the first guest application, the processing is generally reversed in substantially the same manner as the request from the first guest application was originally processed.

Additionally, in at least some of the various embodiments, the FGDP processing at block 420 and block 422 may be performed in part by at least one of the data access application and the compute accelerator application at the node as shown in FIGS. 2 and 3.

Figure 5:
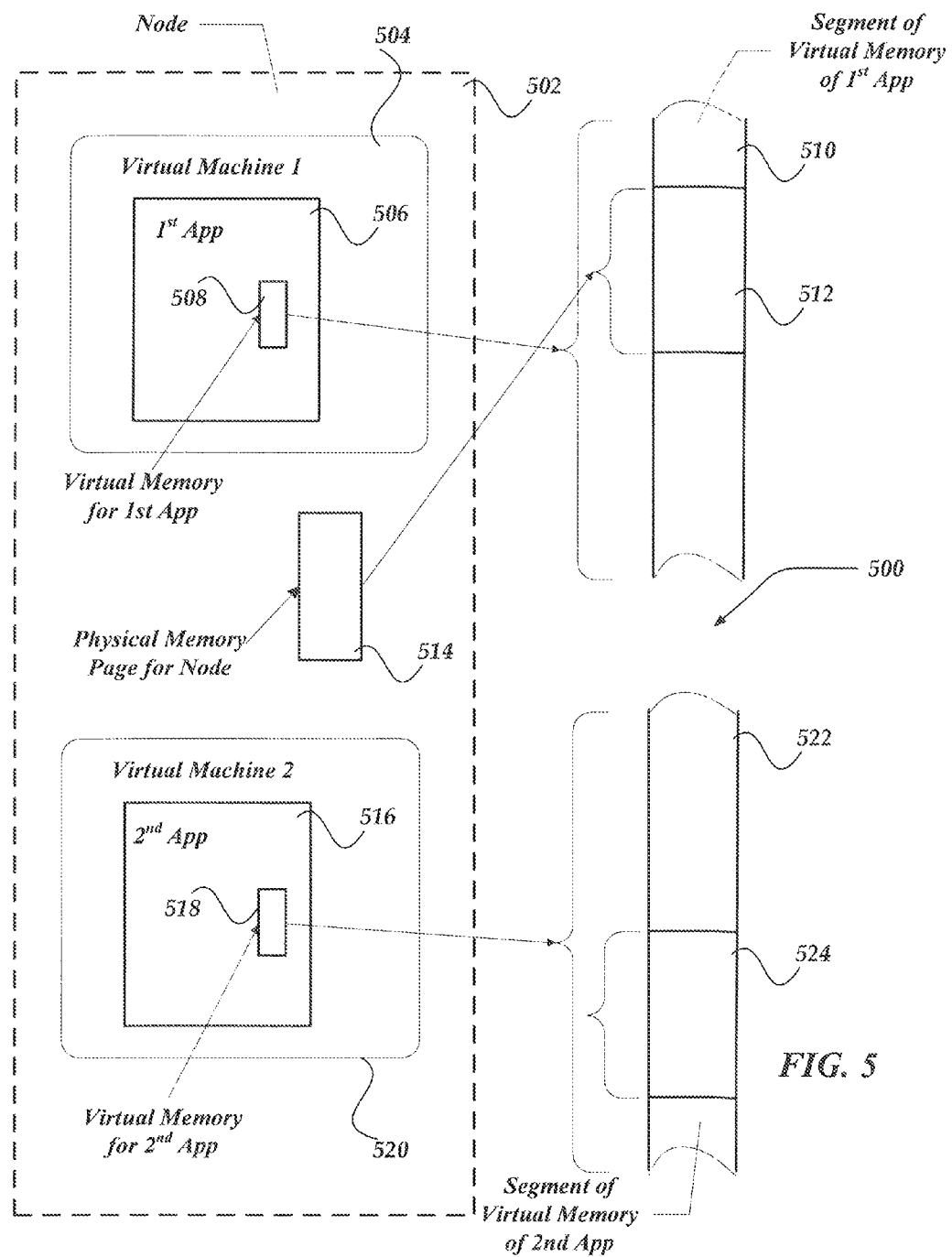
FIG. 5 illustrates a schematic for sharing a physical page of memory in the virtual machine memory of co-resident guest applications that are running on the same node.

FIG. 5 shows a schematic 500 for co-resident guest applications to avoid computationally expensive copying actions at their commonly shared node 502. Schematic 500 illustrates a low-overhead inter-process communication method for the VMs for corresponding guest applications to share access to physical memory pages at node 502. First VM 504 includes first guest application 506 and further includes a corresponding virtual memory 508. Second VM 520 includes second guest application 516 and further includes a corresponding virtual memory 518. Also, node 502 includes a plurality of physical memory pages, but for clarity in the schematic just one of those physical memory pages 514 is shown.

Schematic 500 also illustrates an expanded portion (segment 510) of virtual memory for the first guest application, and further shows an expanded portion (segment 522) of virtual memory for the second guest application. Instead of copying physical memory page 514 into the virtual memory of either of the guest application, a pointer to the physical memory page is copied to either location 512 within segment 510 (shown) or location 524 within segment 522. In this way, the virtual machines can either simultaneously share access or transfer access to the physical memory page for processing by their corresponding guest applications without having to copy the entire physical memory page from the node into each of the virtual memories for their respective guest applications.

Figure 6:
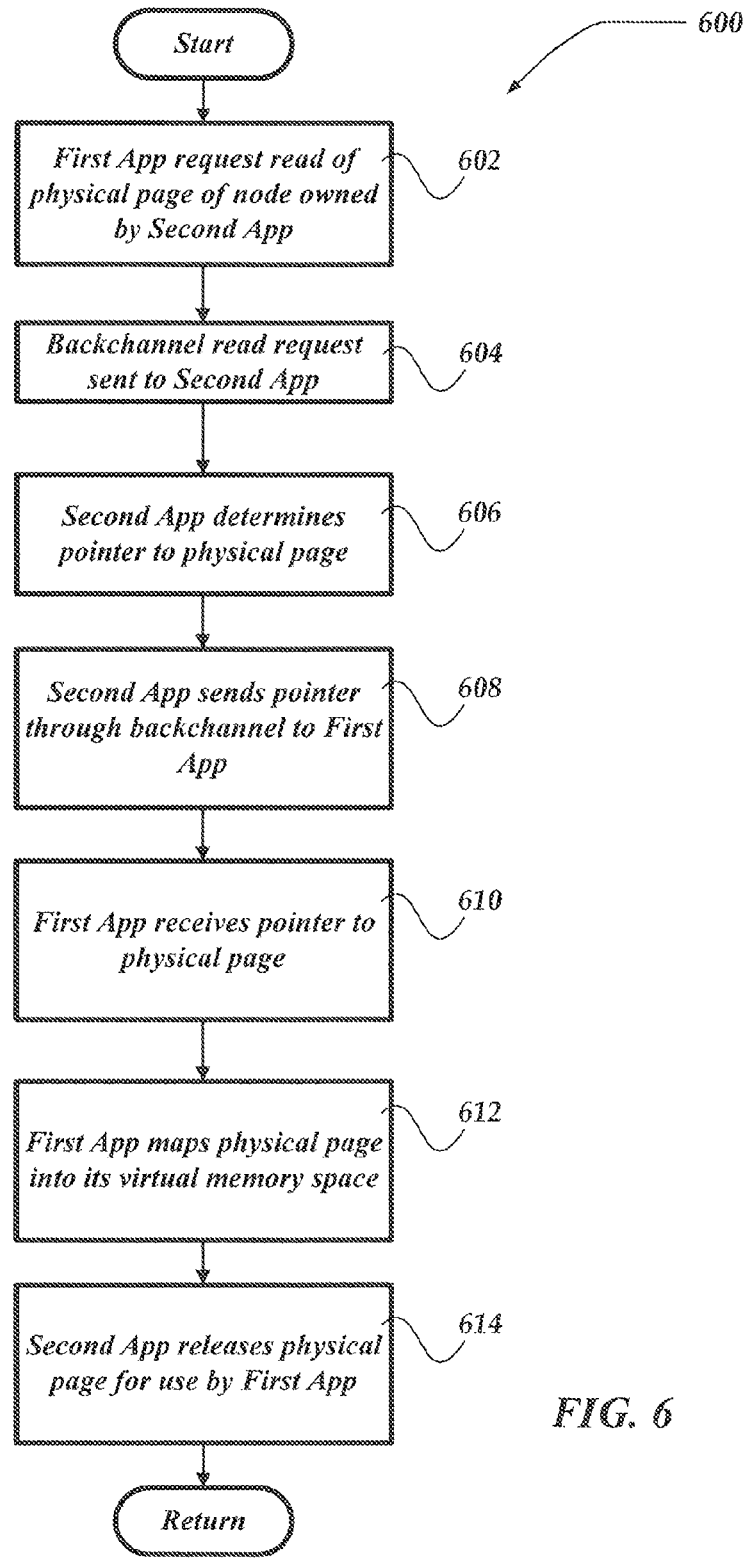
FIGS. 6-7 show flow charts for processes for sharing a physical page of memory in the virtual machine memory of co-resident guest applications that are running on the same node, in accordance with the various embodiments.

FIG. 6 illustrates a low-overhead inter-process communication process 600 for a first guest application running in a VM that requests access and control of data from a co-resident second guest application running in a separate VM. Moving from a start block, the process advances to block 602 where the first guest application sends a request to read data in a physical page(s) of memory that is owned/controlled by the second guest application. At block 604, a backchannel process, such as the FGDP, requests access to that particular data that is controlled by the second guest application. At block 606, rather than making a copy of the requested data and returning the copy to the requesting first guest application, the second guest application determines a pointer to the physical memory page(s) where the requested data is stored.

Next, at block 608, the second guest application returns this pointer to the requesting first application by way of the backchannel process. At block 610, the requesting first guest application receives the pointer to the physical memory page(s). At block 612, the first guest application maps the pointer into the virtual memory space for the first guest application. At block 614, the second guest application releases ownership of the requested physical memory page. The physical page(s) of memory is now part of the requesting first guest application's virtual memory space without having to provide a high-overhead computation copy of the data previously controlled by the second guest application. Next, the process returns to performing other actions.

Figure 7:
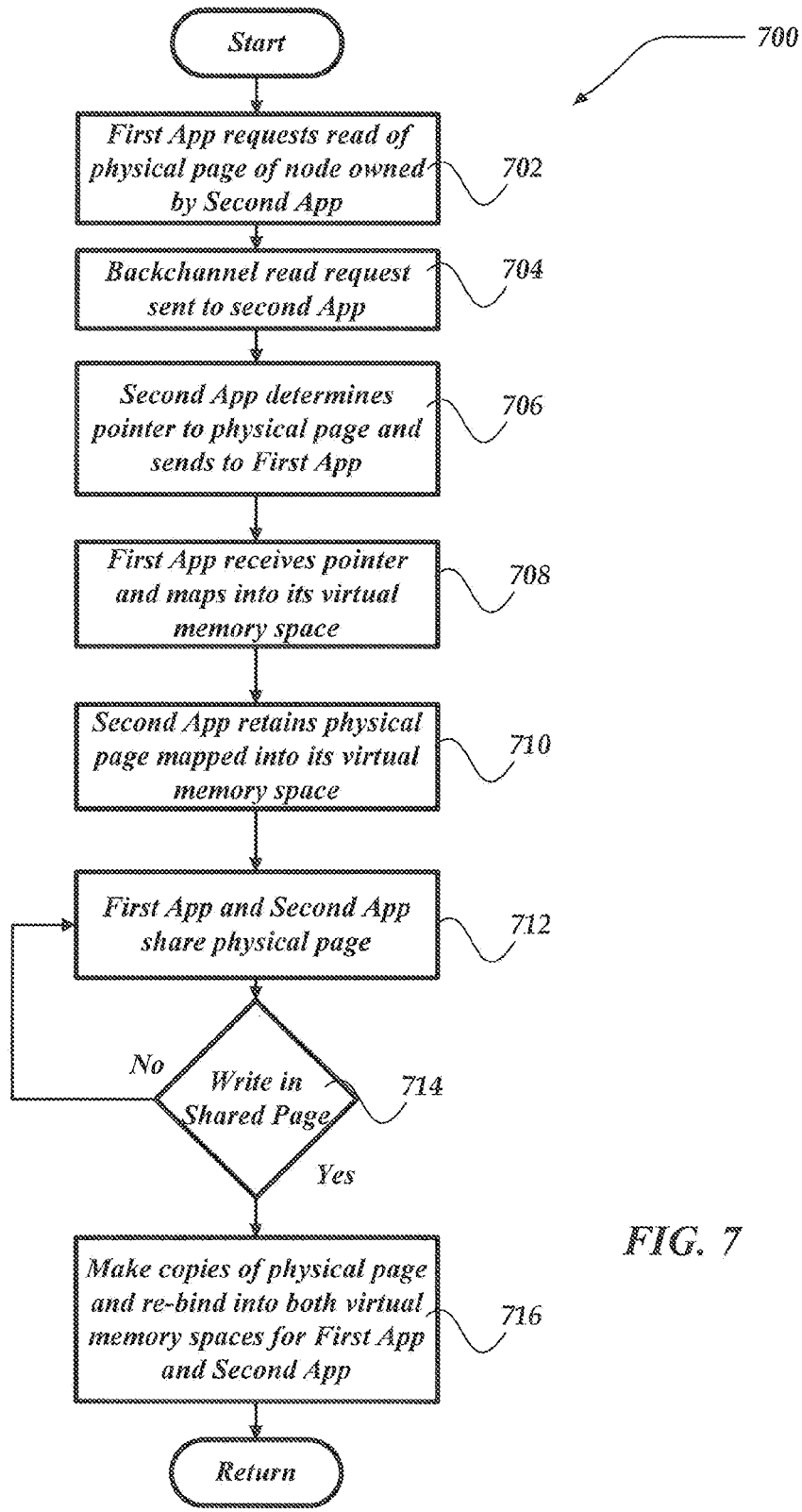

FIG. 7 illustrates a low-overhead inter-process communication process 700 for a first guest application running in a VM that requests shared access to data controlled by a co-resident second guest application running in another VM. Moving from a start block, the process flows to block 702 where the first guest application makes a request for data in a physical page(s) of memory that is owned/controlled by the second guest application. At block 704, a backchannel process, such as the FGDP, requests access to that particular data that is controlled by the second guest application. At block 706, rather than making a copy of the requested data and returning the copy to the requesting first guest application, the second guest application determines a pointer to the physical memory page(s) where the requested data is stored. The second guest application returns this pointer to the requesting first application by way of the backchannel process. At block 708, the requesting first guest application receives the pointer to the physical memory page(s) and maps the pointer into the virtual memory space for the first guest application. At block 710, the second guest application retains ownership of the requested physical memory page which is still mapped into the virtual memory space for the second guest application.

Next, at block 712, the first and second guest applications share ownership of the data in the physical page(s) of memory. Both, the first and second guest applications running in different co-resident VM's continue to execute while sharing the data in the physical page(s) of memory. At decision block 714, if it is detected that a write operation is attempted by either the first or second guest application into the data of the shared physical page(s) of memory, the process flows to block 716 where the shared memory page(s) are subsequently copied into each of the virtual memories of the virtual machines for each of the first and second guest applications. Also, the sharing of the physical page of memory may be terminated for one or both of the first and second guest applications. The data in the physical page(s) of memory is now part of the requesting first guest application's virtual memory space and the second guest application's virtual memory space. Next, the process returns to performing other actions. Alternatively, if the determination at decision block 714 had been negative, the process would have looped back to block 712 until the determination at block 714 was affirmative.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, and the like.

What is claimed as new and desired to be protected by Letters Patent of the United States is:

1. A method for accelerating communication between a first guest application and a second guest application executing on at least one data storage node, comprising:

generating a first virtual machine for the first guest application and a second virtual machine for the second guest application, wherein each virtual machine includes at least a virtual memory and a multiple layer communication protocol stack based at least in part on a plurality of layers of the Open Systems Interconnect model;

if the first guest application and the second guest application are determined to be co-resident on a data storage node, bypassing each lower layer of the communication protocol stack to directly communicate a request for data from the first guest application to the second guest application at a highest layer of the corresponding communication protocol stacks of their virtual machines, wherein the highest layer is an application layer that enables communication independent of a TCP/IP layer socket number;

determining a pointer to data requested by the first guest application, wherein the data resides in at least one physical page of memory at the data storage node and is controlled by the second guest application, wherein the first guest application maps the at least physical page into its virtual memory and the second guest application releases the at least one physical page for use by the first guest application;

providing the pointer to the first guest application to access the data in the at least one physical page of memory at the data storage node; and if the first guest application and the second guest application are determined to be co-resident in a cluster on separate data storage nodes, employing a first network coupled between the separate data storage nodes for communication between the first and second guest applications, wherein the first network is a high bandwidth network.

2. The method of claim 1, further comprising employing a second network for communication between the first and second guest applications if the first guest application or the second guest application is determined to located on another node that is outside the cluster of nodes, wherein the second network provides lower bandwidth communication than the first network.

3. The method of claim 1, wherein if the first and second guest applications are co-resident in the data storage node further comprises transferring control to the first guest application from the second guest application for requested data residing in at least one physical page of memory at the data storage node.

4. The method of claim 1, wherein if the first and second guest applications are co-resident in the same data storage node further comprising:

sharing control between the first guest application and the second guest application for requested data residing in at least one physical page of memory at the data storage node; and copying requested data from the at least one physical page of memory into each virtual memory of each virtual machine for the corresponding first guest application and the second guest application if either guest application writes to the requested data having shared control.

5. A data storage node apparatus for accelerating communication between a first guest application and a second guest application, comprising:

a physical memory for storing data and instructions;
a data storage device for storing data and instructions; and
a processor for executing instructions that perform actions, including:

enabling generating a first virtual machine for the first guest application and a second virtual machine for the second guest application, wherein each virtual machine includes at least a virtual memory and a multiple layer communication protocol stack based at least in part on a plurality of layers of the Open Systems Interconnect model;

if the first guest application and the second guest application are determined to be co-resident on a data storage node, bypassing each lower layer of the communication protocol stack to directly communicate a request for data from the first guest application to the second guest application at a highest layer of the corresponding communication protocol stacks of their virtual machines, wherein the highest layer is an application layer that enables communication independent of a TCP/IP layer socket number;

determining a pointer to data requested by the first guest application, wherein the data resides in at least one physical page of memory at the data storage node and is controlled by the second guest application, wherein the first guest application maps the at least physical page into its virtual memory and the second guest application releases the at least one physical page for use by the first guest application;

providing the pointer to the first guest application to access the data in the at least one physical page of memory at the data storage node; and if the first guest application and the second guest application are determined to be co-resident in a cluster on separate data storage nodes, employing a first network coupled between the separate data storage nodes for communication between the first and second applications, wherein the first network is a high bandwidth network.

6. The apparatus of claim 5, further comprising employing a second network for communication between the first and second guest applications if the first guest application or the second guest application is determined to located on another node that is outside the cluster of nodes, wherein the second network provides lower bandwidth communication than the first network.

7. The apparatus of claim 5, wherein if the first and second guest applications are co-resident in the data storage node further comprises transferring control to the first guest application from the second guest application for requested data residing in at least one physical page of memory at the data storage node.

8. The apparatus of claim 5, wherein if the first and second guest applications are co-resident in the same data storage node further comprising:

sharing control between the first guest application and the second guest application for requested data residing in at least one physical page of memory at the data storage node; and copying requested data from the at least one physical page of memory into each virtual memory of each virtual machine for the corresponding first guest application and the second guest application if either guest application writes to the requested data having shared control.

9. A processor readable non-volatile hardware storage media that includes instructions for accelerating communication between a first guest application and a second guest application executing on at least one data storage node, wherein the execution of the instructions causes actions, comprising:

generating a first virtual machine for the first guest application and a second virtual machine for the second guest application, wherein each virtual machine includes at least a virtual memory and a multiple layer communication protocol stack based at least in part on a plurality of layers of the Open Systems Interconnect model;
  if the first guest application and the second guest application are determined to be co-resident on a data storage node, bypassing each lower layer of the communication protocol stack to directly communicate a request for data from the first guest application to the second guest application at a highest layer of the corresponding communication protocol stacks of their virtual machines, wherein the highest layer is an application layer that enables communication independent of a TCP/IP layer socket number;
  determining a pointer to data requested by the first guest application, wherein the data resides in at least one physical page of memory at the data storage node and is controlled by the second guest application, wherein the first guest application maps the at least physical page into its virtual memory and the second guest application releases the at least one physical page for use by the first guest application;
  providing the pointer to the first guest application to access the data in the at least one physical page of memory at the data storage node; and
if the first guest application and the second guest application are determined to be co-resident in a cluster on separate data storage nodes, employing a first network coupled between the separate data storage nodes for communication between the first and second guest applications, wherein the first network is a high bandwidth network.

10. The media of claim 9, further comprising employing a second network for communication between the first and second guest applications if the first guest application or the second guest application is determined to located on another node that is outside the cluster of nodes, wherein the second network provides lower bandwidth communication than the first network.

11. The media of claim 9, wherein if the first and second guest applications are co-resident in the data storage node further comprises transferring control to the first guest application from the second guest application for requested data residing in at least one physical page of memory at the data storage node.

12. The media of claim 9, wherein if the first and second guest applications are co-resident in the same data storage node further comprising:
  sharing control between the first guest application and the second guest application for requested data residing in at least one physical page of memory at the data storage node; and
  copying requested data from the at least one physical page of memory into each virtual memory of each virtual machine for the corresponding first guest application and the second guest application if either guest application writes to the requested data having shared control.

* * * * *